United States Patent
Aerrabotu

(10) Patent No.: US 8,934,947 B2
(45) Date of Patent: Jan. 13, 2015

(54) MULTI-MODE METHODS AND DEVICES UTLIZING BATTERY POWER LEVEL FOR SELECTION OF THE MODES

(71) Applicant: Motorola Mobility LLC, Libertyville, IL (US)

(72) Inventor: Naveen Aerrabotu, Gurnee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 13/921,444

(22) Filed: Jun. 19, 2013

(65) Prior Publication Data
US 2013/0281154 A1    Oct. 24, 2013

Related U.S. Application Data

(63) Continuation of application No. 11/294,792, filed on Dec. 6, 2005.

(51) Int. Cl.
*H04M 1/00* (2006.01)
*H04W 52/02* (2009.01)
*H04B 1/40* (2006.01)

(52) U.S. Cl.
CPC ........... *H04W 52/0261* (2013.01); *H04B 1/406* (2013.01); *H04W 52/0277* (2013.01)
USPC ..................... 455/574; 455/552.1; 455/553.1; 455/404.1; 455/343.5

(58) Field of Classification Search
USPC ........... 455/436–444, 572, 574, 127.1, 552.1, 455/553.1, 500, 343.1–343.5, 404.1, 521
See application file for complete search history.

(56) References Cited

U.S. PATENT DOCUMENTS

| | | | |
|---|---|---|---|
| 5,392,462 A | 2/1995 | Komaki | |
| 2002/0132636 A1 | 9/2002 | Stockhusen | |
| 2002/0147008 A1 | 10/2002 | Kallio | |
| 2003/0040298 A1 | 2/2003 | Heatley | |
| 2004/0090945 A1 | 5/2004 | Mahany et al. | |
| 2004/0247993 A1 | 12/2004 | Johnson et al. | |
| 2005/0153736 A1* | 7/2005 | Ganton | 455/553.1 |
| 2006/0166663 A1 | 7/2006 | Haehnichen et al. | |
| 2006/0168123 A1* | 7/2006 | Krstulich | 709/219 |
| 2006/0223465 A1* | 10/2006 | Akiba et al. | 455/127.4 |
| 2006/0291419 A1* | 12/2006 | McConnell et al. | 370/331 |
| 2007/0037609 A1 | 2/2007 | Zhang et al. | |

FOREIGN PATENT DOCUMENTS

WO    2005009062 A1    1/2005

* cited by examiner

*Primary Examiner* — Raymond Dean
(74) *Attorney, Agent, or Firm* — Leydig, Voit & Mayer, Ltd.

(57) ABSTRACT

Disclosed are a methods and devices in a battery-powered multimode wireless communication device (102) that operates pursuant to first and second communication protocols in idle and active modes. The battery power level is monitored and may drop to a predetermined threshold while operating pursuant to the first communication protocol. The device switches from the first wireless communication protocol so that the device is operating in accordance with the second communication protocol in the event that the battery power level has dropped to the predetermined threshold while operating pursuant to the first communication protocol in idle mode or in active mode.

8 Claims, 5 Drawing Sheets

US 8,934,947 B2

MULTI-MODE METHODS AND DEVICES UTLIZING BATTERY POWER LEVEL FOR SELECTION OF THE MODES

FIELD OF THE DISCLOSURE

The present disclosure relates generally to wireless communications, and more particularly to switching between modes in multi-mode wireless communication devices based different criteria, for example, based on a battery power level and/or the cost of service.

BACKGROUND

Mobile communication devices, such as battery powered cellular telephones, can be equipped with multiple transceivers. In addition to communicating pursuant to traditional communication protocols such as CDMA and GSM, mobile communication devices can also communicate pursuant to non-cellular protocols. For example, mobile communication devices are often enabled with a Bluetooth transceiver. For communication pursuant to Wireless Fidelity (WIFI) or wireless local area network (WLAN) protocols, mobile communication devices can be equipped with a WIFI transceiver in addition to their CDMA and GSM transceivers.

Dual-mode communication devices can leverage the ubiquity of cellular networks (GSM and CDMA) with the high performance and low operational costs of local-area WIFI networks. The dual-mode roaming capability allows wireless handsets to utilize cellular or WIFI networks to place and receive calls, and to provide Internet access for email and Web surfing while the device is in an active mode (in call).

The various aspects, features and advantages of the disclosure will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

In one embodiment, a battery-powered multimode wireless communication device that operates pursuant to a first and second communication mode switches from the first active communication mode so that the device operates to the second active communication mode in the event that battery power level drops to a predetermined threshold while operating pursuant in the first active communication mode. In one embodiment, the device switches from operation on a cellular communication protocol while in a call to operation on a wireless local area network protocol in the event that the battery power level drops to the predetermined threshold. The wireless communication device may also perform partial switch the operation of certain functions to the other transceiver. For example, a video stream could be handed over from a first transceiver to another transceiver and voice call could be maintained on the first transceiver.

The switching process can be transparent to the user. Alternatively, the device may prompt the user with a request for instructions so that the user may choose to switch from one mode to the other. In some applications, an emergency call takes priority over any benefits that may be obtained by switching protocols, and thus in these embodiments there is no switching between protocols during the emergency call. An emergency call can be identified, for example, by the telephone number input to the mobile communication device.

In another embodiment, the device hands off a function performed on the wireless communication device to an external device wherein the external device performs the function performed on the wireless communication device. For example, the device could connect to an external audio device, e.g., sound system, or to an external video system, e.g., a laptop or external monitor, using a Bluetooth or through Internet Protocol connection when the battery threshold is reached, thus reducing power consumption associated with performing the function on the wireless communication device.

Figure 1:
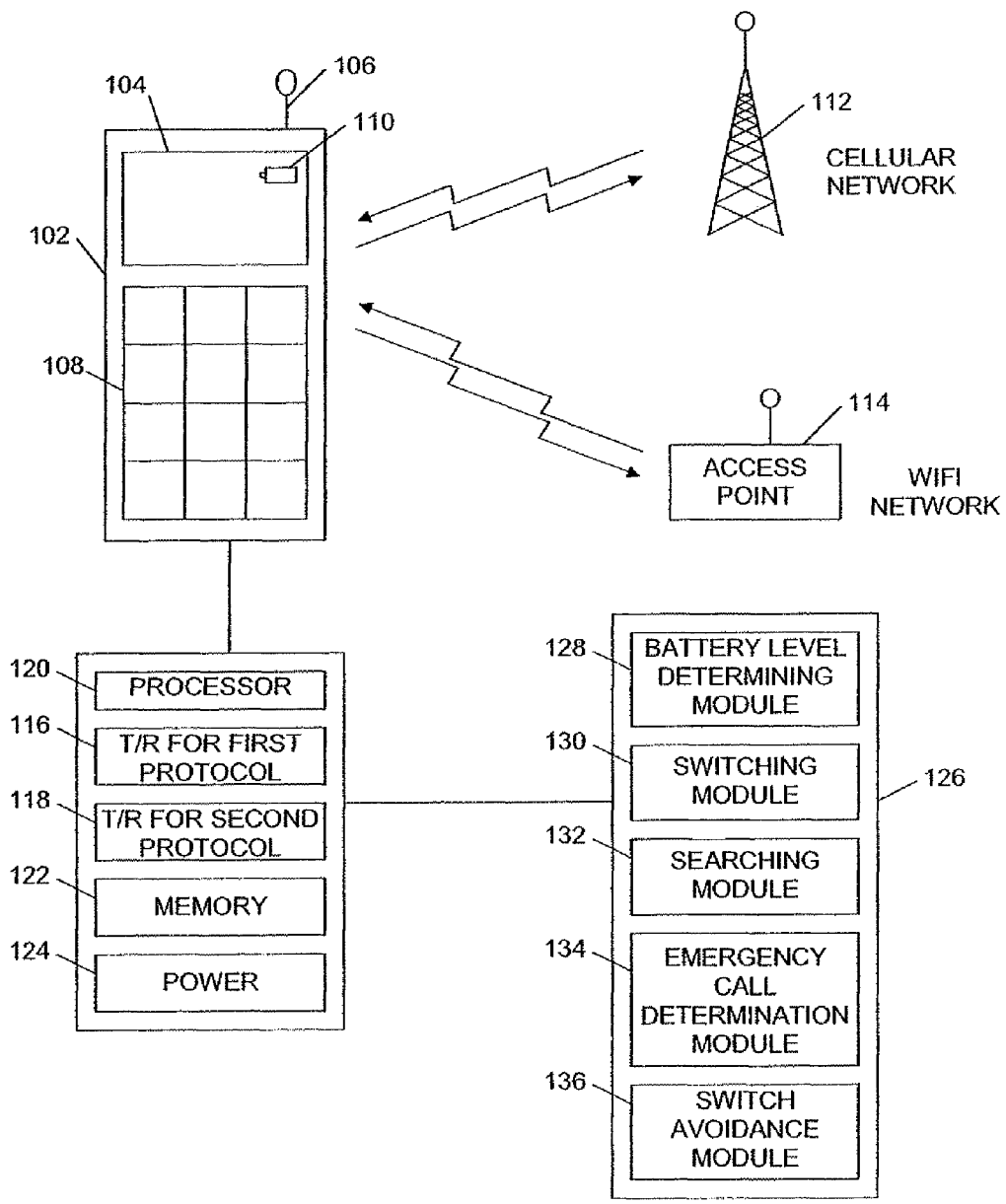
FIG. 1 is a wireless communication system.

FIG. 1 illustrates a mobile communication device, some of its components and two networks that operate pursuant to different communication protocols. More than two different communication protocols are within the scope of this discussion as well. The device 102 can have a display 104, an antenna 106, a keypad for input 108 and a battery usability icon 110 on the display. The mobile communication device 102 represents a wide variety of communication devices that have been developed for use within various networks. Such handheld communication devices include, for example, cellular telephones, messaging devices, mobile telephones, personal digital assistants (PDAs), notebook or laptop computers incorporating communication modems, mobile data terminals, application specific gaming devices, video gaming devices incorporating wireless modems, and the like. Any of these portable wireless communication devices may be referred to as a mobile station or user equipment. It is understood that any and all mobile wireless communication devices are within the scope of this discussion.

FIG. 1 depicts the mobile communication device 102 configured to communicate with two networks, a cellular network 112 and a WIFI network through its access point 114. The networks typically communicate in accordance with different communication protocols. The cellular network protocol may be for example, CDMA, GSM, and/or W-CDMA or some other cellular communication protocol. Exemplary WIFI network protocols include, but are not limited to, IEEE 802.11/802.16. Other protocols are within the scope of this disclosure. A multi-mode mobile communication device may include a plurality of transceivers for receiving and transmitting pursuant to the different protocols. A first transceiver for communication pursuant to a first protocol 116 and a second transceiver for communication pursuant to a second protocol 118 are shown. In other embodiments, the first and second transceivers could be different incarnations of a single transceiver, for example, a software-defined radio transceiver. In this disclosure the terms "first protocol" and "second protocol" are used interchangeably. It is clear from the context whether the first protocol refers to, for example, a WIFI protocol, and the second protocol refers to, for example, cellular protocol. It is also understood that the mobile device may communicate via more than two transceivers.

The mobile communication device is further configured with a processor 120, memory 122 and a power source 124, such as a battery. Instruction modules 126 can include instructions that are in hardware and/or software. The operations of the instruction modules will be described in detail in reference to the flow charts and signal flow diagrams discussed below. Briefly, the modules can include a battery power level determination module 128 coupled to the battery and a switching module 130 that switches the device 102 from operation via the first communication protocol transceiver 116 to operation via the second communication protocol transceiver 118, for example, in the event that the battery power level drops to a predetermined threshold while operating via the first communication transceiver. The modules can further include a searching module 132 for searching for service on a different network in the event that the battery power level drops to the predetermined threshold. The modules can further include an emergency call determination module 134 for determining whether the device is in an emergency call activation state, and a switch avoidance module 136 operable for when the device is in an emergency call activation state to avoid breaking emergency communication.

A dual or multi-mode device 102 may operate in either idle mode or active mode. As mentioned above, there are at least two situations, in accordance with this disclosure, that the battery longevity may be improved in the event that communication over an alternative network is available. In idle mode, where it's determined that battery power level has dropped to a predetermined threshold while operating pursuant to a first communication protocol, the device switches to operation pursuant to a second communication protocol. Also, in active mode, where it's determined that battery power level has dropped to a predetermined threshold while operating pursuant to a first communication protocol, the device switches to operation pursuant to a second communication protocol.

In some embodiments, in active mode, a cellular communication may cost more than a WIFI communication. Therefore, it may be more cost effective to maintain communication with a WIFI service when possible due to air time fees. However, once a call over the WIFI service is completed, the device may operate pursuant to the WIFI protocol while in an idle mode. When the device operates pursuant to the WIFI protocol in idle mode, the drain on the battery power level can be greater than were the device to operate pursuant to a cellular communication protocol.

Figure 2:
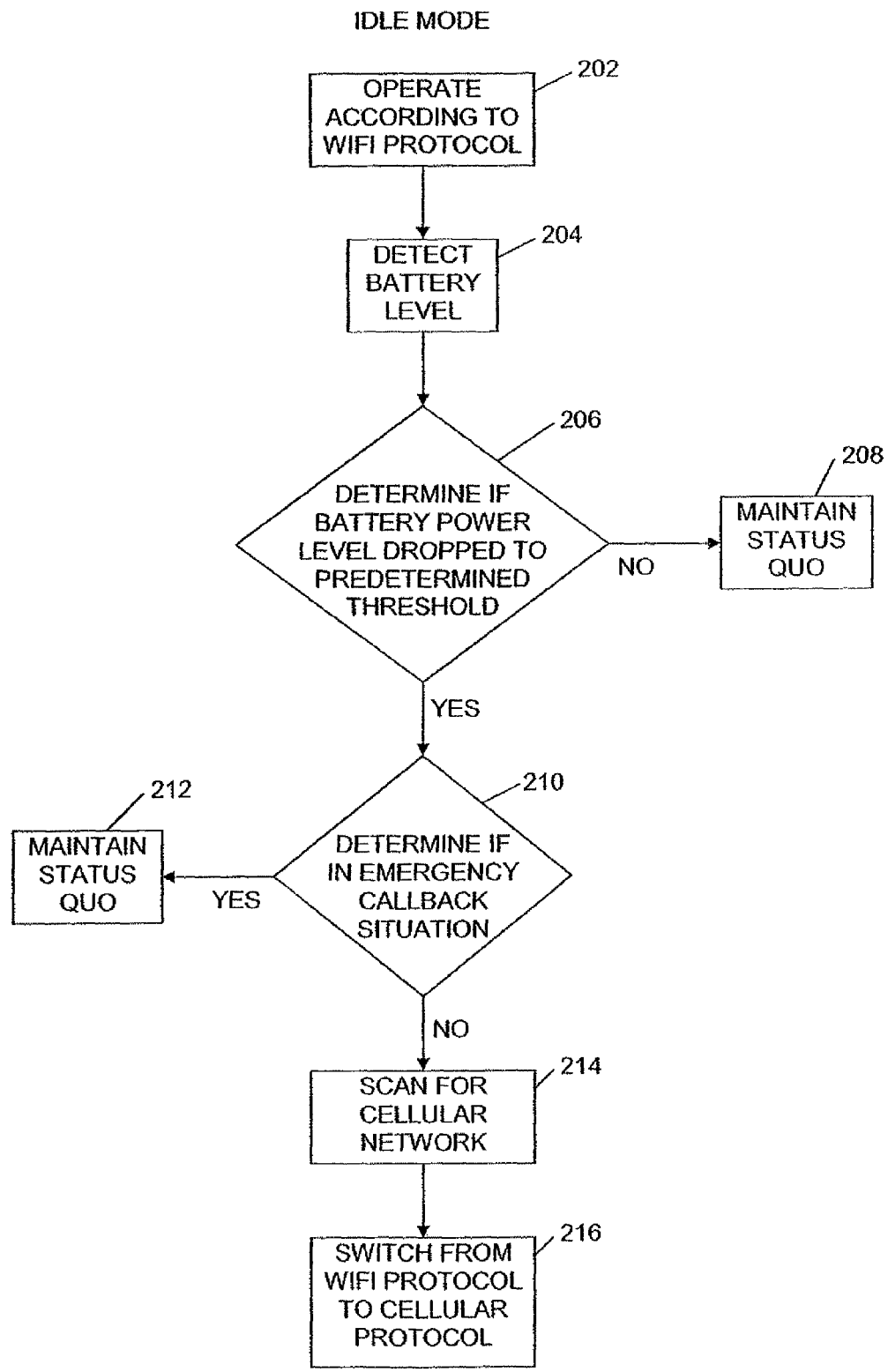
FIG. 2 is a flow chart illustrating the operation of a mobile communication device in idle mode.

FIG. 2 is a flow chart illustrating the operation of a mobile communication device in idle mode. As described above, the device may operate pursuant to a first protocol 202, here a WIFI protocol, while in idle mode. More generally, however, the first protocol may be any other communication protocol. The battery level of the device may be monitored 204, periodically or constantly. At 206, a query is made to determine whether the battery power level has dropped to a predetermined threshold. If there is no determination that the battery power level has dropped to a predetermined threshold while operating pursuant to the first communication protocol, here a WIFI protocol, in idle mode, the device maintain its operation in pursuant to the first protocol 208.

FIG. 2 further illustrates that when in idle mode and operating pursuant to the first protocol, the device can determine if the device is in an emergency call situation 210. In such an event, the device may not switch from the first communication protocol to the second communication protocol in the event that the battery power level drops to the predetermined threshold. Accordingly, the device may maintain the status quo 212. For example, if the battery-powered multimode wireless communication device were in an emergency call situation, an emergency service provider such as the police or fire department may receive the mobile communication device's telephone number by, for example, a caller ID, and may try to return a call to the mobile communication device. In an emergency call situation, it may be beneficial that during an emergency call back period, the mobile communication device should be able to receive a callback from the Public Safety Answering Point (PSAP) pursuant to the same communication protocol from which the call was made.

Therefore when the battery power level drops to a predetermined threshold, there may be sufficient battery usability to sustain a short cellular call during an emergency callback period. Once the battery reaches this state, the device may indicate, for example, on its display, that multimedia and other battery intensive operations should be avoided. Alternatively, the device may automatically shut down ancillary activity. The predetermined battery power threshold can be calibrated to sustain the power necessary to receive a callback during a callback period, or may be calibrated according to a different standard.

After the query of the battery power level while in idle mode, the device operating pursuant to the first protocol, here, a WIFI network protocol, may begin scanning for service pursuant to a second protocol, here, a cellular network in the event that the battery power level has dropped to the predetermined threshold 214. The device may then switch from the first wireless communication protocol so that the device can operate in accordance with the second communication protocol 216 in the event that the battery power level has dropped to the predetermined threshold in idle mode. Accordingly, some battery usability may be prolonged.

Figure 3:
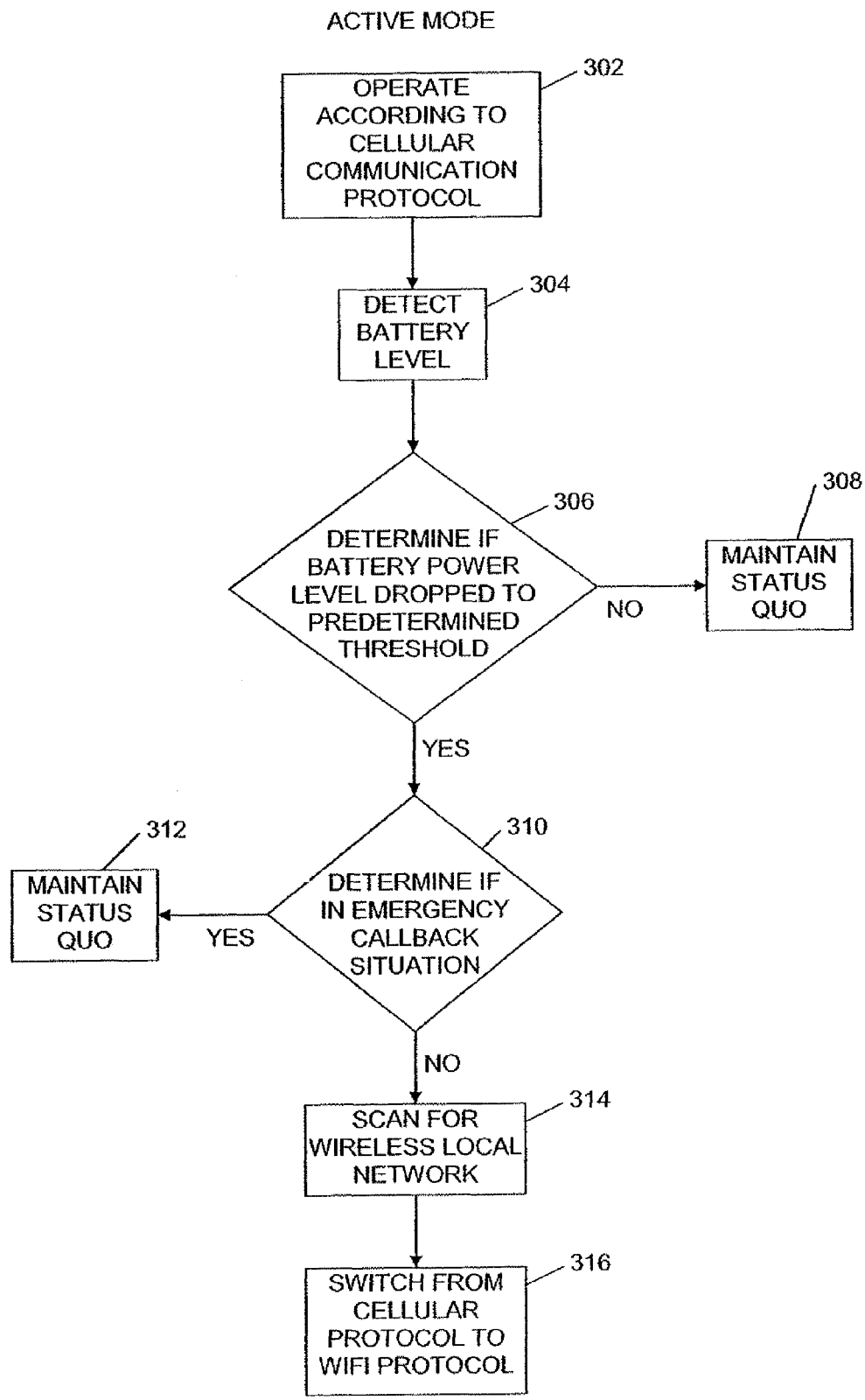
FIG. 3 is a flow chart illustrating the operation of a mobile communication device in active mode.

FIG. 3 is a flow chart illustrating operation of a mobile communication device in active mode. As described above, the device may be operating pursuant to a first protocol 302, here a cellular communication protocol while in an active mode. The battery level of the device may be monitored 304 periodically or constantly. A query can be made whether the battery power level has dropped to a predetermined threshold 306. If there is no determination that the battery power level has dropped to a predetermined threshold while operating pursuant to the first communication protocol, here a cellular protocol, in an active mode, the device can maintain its operation pursuant to the first protocol 308.

The switch in either the idle mode or the active mode can be made automatically or by response of the user to a prompt of the device. In FIG. 1, the battery icon 110 on the display may provide an indication that the switch from a first communication protocol to a second communication protocol may be made. It is understood that any type of prompt to switch protocols when the battery power drops to a predetermined level is within the scope of this discussion.

FIG. 3 further shows that when in active mode and operating pursuant to the first protocol, the device can determine if the device is in an emergency callback situation 310. In the event that the battery power level drops to the predetermined threshold during an emergency call, the device does not switch from the first communication protocol to the second protocol. Accordingly, the device may maintain the status quo 312 when in an emergency callback situation.

After the query for the battery power level in active mode, the device operating pursuant to the first protocol, here, cellular network protocol, begins scanning for service pursuant to a second protocol, here, a WIFI network protocol in the event that the battery power level has dropped to the predetermined threshold 314. The device then switches from the first wireless communication protocol so that the device is operating in accordance with the second communication protocol 316 in the event that the battery power level has dropped to the predetermined threshold while operating pursuant to the first communication protocol in active mode. Accordingly, the battery usability may be prolonged.

The scan rate may also be based on the battery power level. In the event the battery power level has dropped to a predetermined threshold, that is the same as that which is described above, or different from that which is described above, the scan rate for service pursuant to a second protocol may be slowed to conserve power.

Figure 4:
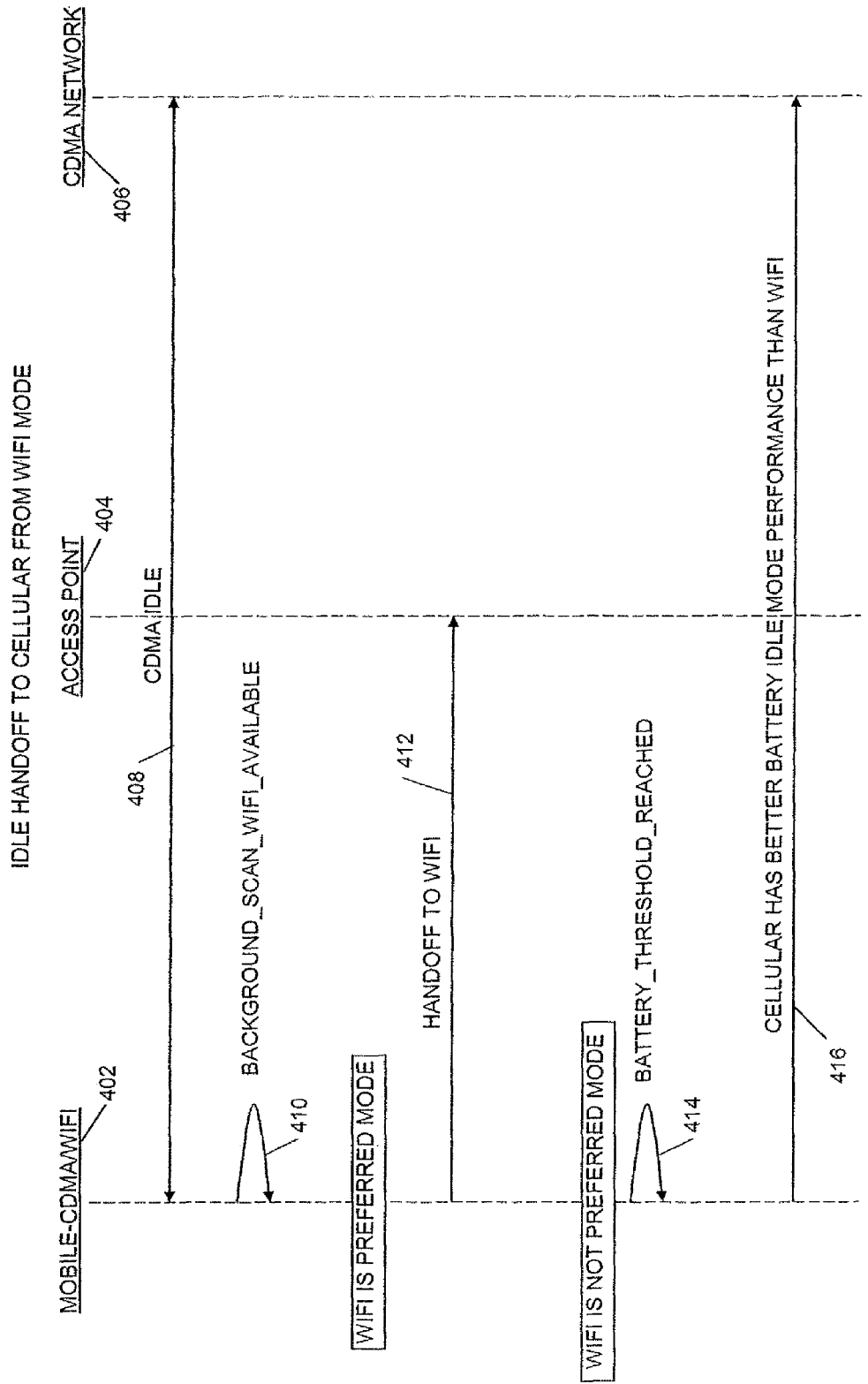
FIG. 4 is a signal flow diagram of a mobile communication device in idle mode operating pursuant to a WIFI protocol.

FIG. 4 is a signal flow diagram of a mobile communication device in idle mode. The device 402, the WLAN access point 404 and the cellular network 406 are depicted therein. The device can be in an idle state pursuant to a first communication protocol, in this example, a cellular network protocol 408. The device can perform a background scan for a WIFI access point 410 to establish communication under a second protocol, in this example, a WIFI communication protocol. If the WIFI access point is found, there may be a switch from the cellular network to the WIFI access point when the device is in the idle state 412. However, in the event that the battery power level drops to a determined threshold level 414, the device can switch in its idle state so that it is operating pursuant to a cellular communication protocol 416. Accordingly, battery usability may be prolonged.

Figure 5:
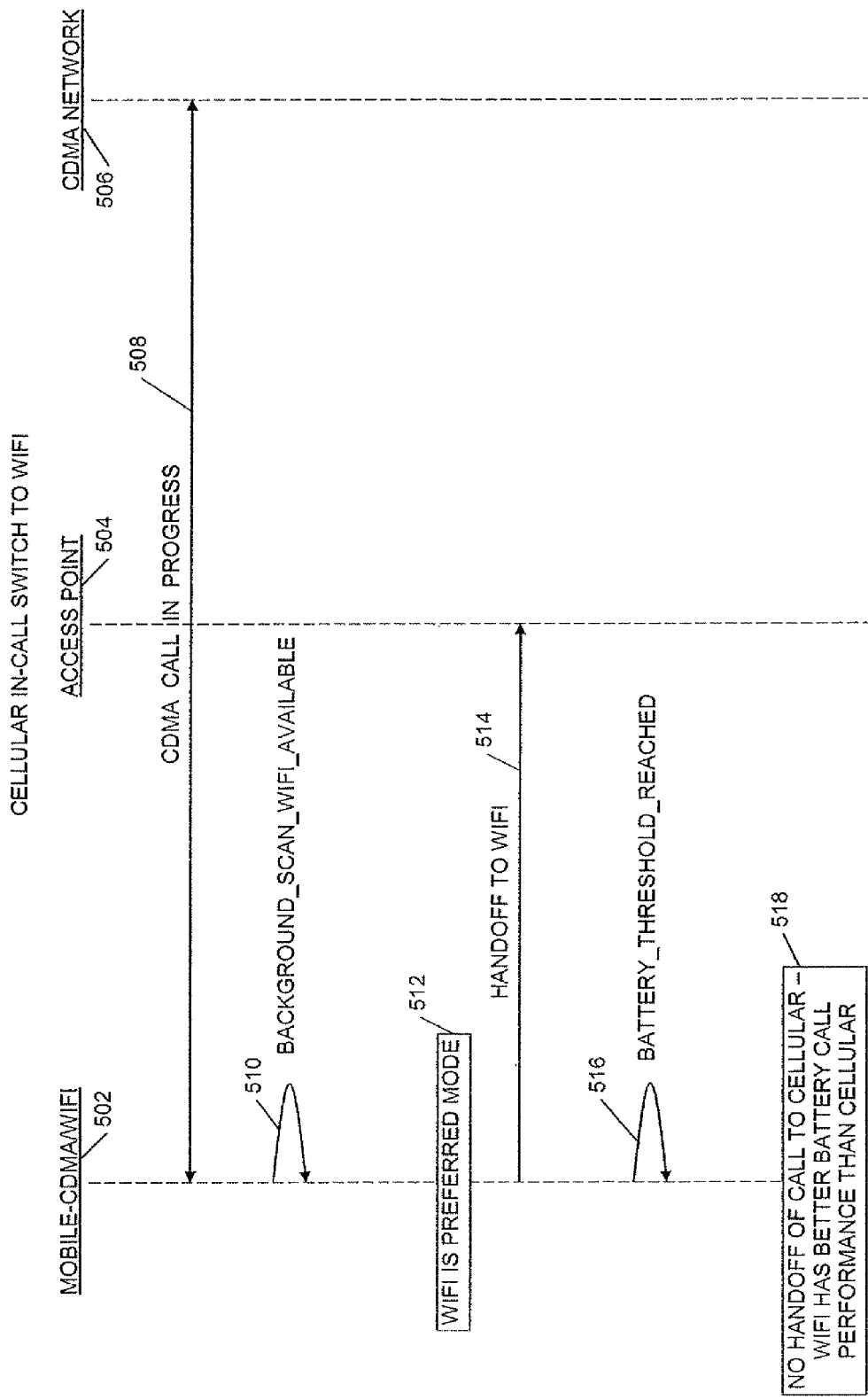
FIG. 5 is a signal flow diagram of a mobile communication device in active mode operating pursuant to a cellular communication protocol.

FIG. 5 is a signal flow diagram of a mobile communication device in active mode. The device 502, the WLAN access point 504 and the cellular network 506 are depicted therein. A cellular network call is in progress at 508. At 510, the device may perform a background scan to see if WIFI is available. If available, wherein WIFI is the preferred mode 512, there is a hand-off to the WIFI access point of a call in progress 514. If it is determined that the battery power level has dropped to a predetermined threshold level 516, the active call state can remain with the WIFI access point 518 since the WIFI communication protocol can have a better battery in-call performance than does a call over a cellular network. Accordingly, the battery usability may be prolonged.

Since it has been found that in an idle state, less power is consumed when operating pursuant to a cellular communication protocol than when operating pursuant to a WIFI communication protocol, the device may increase its longevity based on current battery consumption if the device were to switch from the more consumptive to the less consumptive communication protocols. The same can be true in the active state, though the relationship is reversed.

While the present disclosure and the best modes thereof have been described in a manner establishing possession by the inventors and enabling those of ordinary skill in the art to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a battery-powered multimode wireless communication device that operates pursuant to a first active communication mode and to a second active communication mode, the method comprising:
    running, on the wireless communication device, a first function and a second function;
    determining whether a battery-power level has dropped to a predetermined threshold while operating pursuant to the first active communication mode;
    if the battery-power level drops to the predetermined threshold while operating pursuant to the first active communication mode, then determining whether the first function is related to an emergency call; and
    if the first function is not related to the emergency call, then switching from operation of the wireless communication device in the first active communication mode to operation in the second active communication mode for the first function while continuing to operate in the first active communication mode for the second function.

2. The method of claim 1 wherein the first and second functions are selected from the group consisting of: a video streaming function and a voice calling function.

3. The method of claim 1 wherein switching from the first active communication mode includes switching from operation on a cellular communication protocol to operation on a wireless local area network protocol.

4. The method of claim 1 wherein switching from the first active communication mode includes handing off a third function running on the wireless communication device to an external device.

5. A battery-powered multimode wireless communication device that operates pursuant to a first active communication mode and to a second active communication mode, the wireless communication device comprising:
    a processor that runs a first function and a second function;
    a battery-power level determination module coupled to a battery; and
    a switching module that, if the battery-power level drops to a predetermined threshold while operating pursuant to the first active communication mode, determines whether the first function is related to an emergency call, and, if the first function is not related to the emergency call, switches from operation of the wireless communication device in the first active communication mode to operation in the second active communication mode for the first function while continuing to operate in the first active communication mode for the second function.

6. The method device of claim 5 wherein the first and second functions are selected from the group consisting of: a video streaming function and a voice calling function.

7. The method device of claim 5 wherein switching from the first active communication mode includes switching from operation on a cellular communication protocol to operation on a wireless local area network protocol.

8. The method device of claim 5 wherein switching from the first active communication mode includes handing off a third function running on the wireless communication device to an external device.

* * * * *

UNITED STATES PATENT AND TRADEMARK OFFICE
CERTIFICATE OF CORRECTION

| | | |
|---|---|---|
| PATENT NO. | : 8,934,947 B2 | Page 1 of 1 |
| APPLICATION NO. | : 13/921444 | |
| DATED | : January 13, 2015 | |
| INVENTOR(S) | : Aerrabotu | |

It is certified that error appears in the above-identified patent and that said Letters Patent is hereby corrected as shown below:

On the Title Page, Item [54] and in the Specification, Column 1, line 1-3, Title, MULTI-MODE METHODS AND DEVICES UTLIZING BATTERY POWER LEVEL FOR SELECTION OF THE MODES should read MULTI-MODE METHODS AND DEVICES UTILIZING BATTERY POWER LEVEL FOR SELECTION OF THE MODES Signed and Sealed this
Twenty-first Day of April, 2015

Michelle K. Lee
*Director of the United States Patent and Trademark Office*